United States Patent [19]

Ohneda et al.

[11] Patent Number: 5,069,095
[45] Date of Patent: Dec. 3, 1991

[54] PIPE CENTERING APPARATUS

[75] Inventors: Noboru Ohneda, Oyamashi; Shunta Ushioda, Yukishi; Haruo Arima; Ichiro Hashimoto, both of Oyamashi; Denziro Kaneko, Tochigishi; Kazuo Sugiyama, Shimodateshi; Tsuguo Fukazawa, Oyamashi; Teruo Tachi, Kasamashi; Takashi Mukasa, Yukishi, all of Japan

[73] Assignee: Showa Aluminum Kabushiki Kaisha, Osaka, Japan

[21] Appl. No.: 616,378

[22] Filed: Nov. 21, 1990

[30] Foreign Application Priority Data

Nov. 30, 1989 [JP] Japan ................................ 1-312362

[51] Int. Cl.⁵ ...................... B23B 15/00; B65G 47/24
[52] U.S. Cl. ................................... 82/124; 29/33 T; 198/345.1; 414/746.5; 414/78.3; 414/910
[58] Field of Search ............. 82/124; 414/746 S, 754, 414/783, 910; 198/345.1, 836.1; 83/418; 29/33 P, 33 T

[56] References Cited

U.S. PATENT DOCUMENTS 2,371,906 3/1945 Millholland ........................ 29/33 P
3,662,631 5/1972 Baechle et al. ........................ 82/124

Primary Examiner—Steven C. Bishop

[57] ABSTRACT

A pipe centering apparatus is of such a structure that pipes of certain kinds such as aluminum short pipes transported by a conveyor are centered with their longitudinal centers aligned with each other, before the pipes are subjected to chamfering or other processes. The pipe centering apparatus in the invention comprises a pair of right and left gears in mesh with each other and rotatably mounted on a main frame, a pair of right and left racks respectively in mesh with the right and left gears, and a pair of right and left regulators respectively secured to the right and left racks so as to come into contact with ends of the pipes, wherein the gears are rotated to cause the regulators to move towards each other and to contact the pipe ends, thereby precisely centering the pipes even where the pipes are not of strictly the same length.

4 Claims, 2 Drawing Sheets

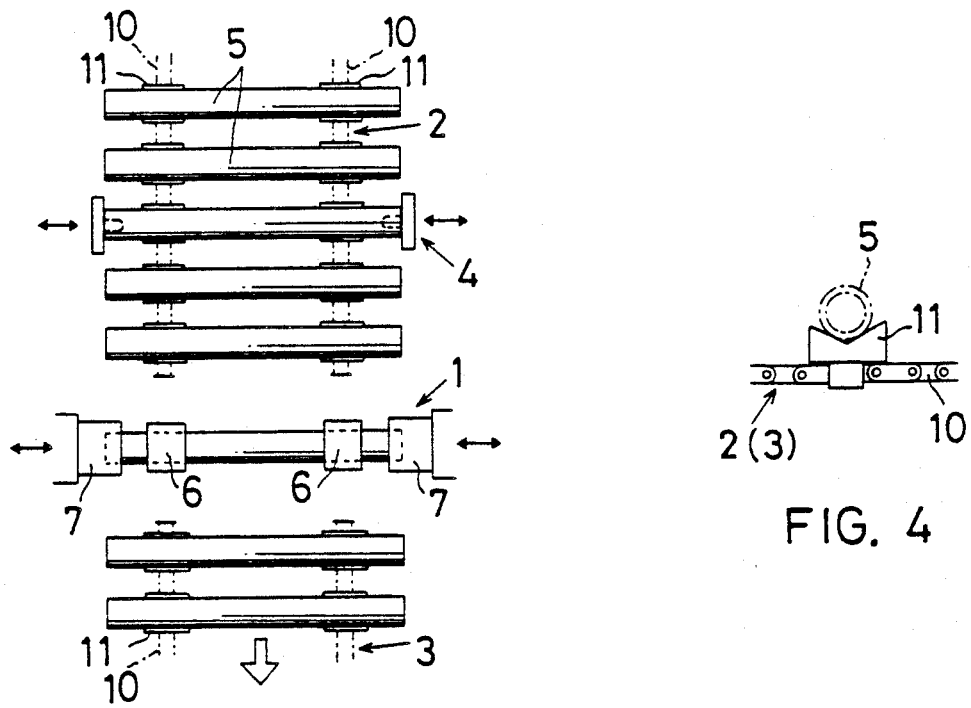
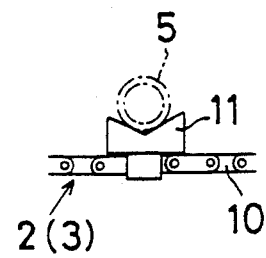
FIG. 3
FIG. 4
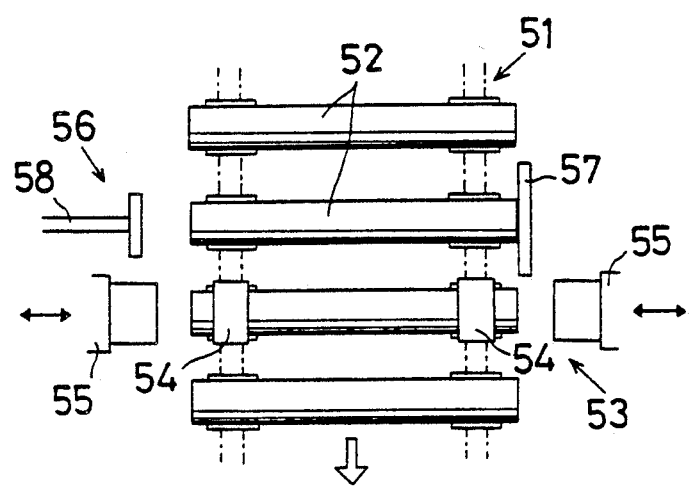
FIG. 5
(Prior Art)

PIPE CENTERING APPARATUS

BACKGROUND OF THE INVENTION

1. Field of the Invention

The invention relates to a pipe centering apparatus used to center, on an appropriate bed or the like, metallic pipes such as aluminum pipes, plastics pipes or other pipes of a predetermined length, and more particularly the invention relates to a pipe centering apparatus used to cause such pipes to stand in row and side by side with their longitudinal centers aligned with each other while they are being transported on a conveyor or the like but before they are subjected to a cutting process or a machining process in which their end surfaces are machined or finished.

2. Description of Prior Art

In some fields of industry, there are used certain kinds of relatively short pipes which are made of for instance aluminum and to be precisely finished as to their diameter, non-eccentricity, wall thickness, straightness and other features. In general, elongate drawn pipes made by drawing raw extruded pipes are corrected of their straightness and are cut into the relatively short pipes. And, chips produced by the cutting operation and sticking to the end surfaces of short pipes are removed before edges of the end surfaces are rounded or chamfered to finish the short pipes.

The chamfering operation has been carried out for example in such a manner as shown in FIG. 5. Clampers 54 of a double-ended chamfering machine 53 hold a short pipe 52 on a conveyor 51 on which the pipe has been transported. Rotary machine tools 55 disposed on the right-hand side and left-hand side of the conveyor are then operated to rotate about their own axes and to inwardly move in a symmetrical manner towards each other. The rotary machine tools thus bear against the ends of the pipe 52 to thereby chamfer the corner portions or edges of said ends.

It is however to be noted that the short pipes 52 on the conveyor 51 are more or less at unaligned state in respect of their longitudinal positions. If the pipes in such an "irregular" state are held by the clampers 54 and are machined by the chamfering machine 53, then machining allowance or degree for one end of the pipe 52 will become different from that for the other end. This will bring about a drawback that effective machining period of time and actually machined states are different between the ends of each pipe. Further, cutting blades will be abraded to different degrees between the right and left rotary machine tools 55, thereby shortening the life of one cutting blade. In an extraordinary case, one end of the pipe 52 will remain unmachined.

In order to avoid such disadvantages, it has been required to center the pipe 52 before it is clamped by the clampers 54 of the chamfering machine 53.

Therefore, the centering of the pipes has been done using for example an apparatus 56 shown in FIG. 5. The prior art centering apparatus 56 comprises a stopper 57 on one side of the conveyor 51, and a pneumatic or hydraulic cylinder 58 on the other side of the conveyor, with the conveyor being interposed between the stopper and the cylinder which face the stopper. The stopper 57 regulates position of one end of each pipe 52 which has been transported on the conveyor to the centering apparatus 56 and is pushed towards the stopper by the cylinder, thereby centering the pipe. In the prior art centering apparatus 56 as described above, position of only one end of each cut pipe 52 is regulated so that it is difficult to accurately center all of the cut pipes 52 even in a case wherein pipe length varies very slightly between the cut pipes 52 transported to the apparatus. Particularly, in a case where an elongate drawn pipe is cut into shorter pipes to be chamfered, such a problem becomes more severe in the prior art apparatus 56 because length of the drawn elongate pipes tends to vary to a remarkable degree due to the nature of the drawing process.

Thus, the prior art apparatus 56 also fails to exactly chamfer both the ends of each cut pipe 52. The difference in the machining times and in the life of cutting blades of the rotary machine tools 55 cannot be diminished by the apparatus 56, between one end and the other end of each cut pipe.

In addition, the cylinder 58 of the prior art centering apparatus 56 pushes towards the stopper 57 the pipes 52 lying on the conveyor 51. Such a sliding contact of the pipes 52 with the conveyor 51 causes scratches of outer surfaces of the pipes.

Those scratches or flaws will be very serious defects if the pipes 52 produced by the drawing process are used as photosensitive drums which bear thereon photosensitive layers such as selenium layer or organic photoconductive layers to be installed in the electronic copiers, laser printers or the likes. Consequently, yield of acceptable products has not been satisfactorily high.

OBJECTS AND SUMMARY OF THE INVENTION

Accordingly, one of primary objects of the invention which was made to resolve the abovementioned problems in the prior art apparatuses is to provide a pipe centering apparatus which can accurately perform the centering of pipes even where the pipes vary in their length.

Another primary object of the invention is to provide a pipe centering apparatus which can not only accurately perform the centering of pipes but also can avoid the scratching of the pipes.

Other objects and advantages of the invention will become apparent from the description given below on embodiments referring to the drawings.

In order to accomplish the primary objects, the invention provides a pipe centering apparatus which comprises a pair of right and left gears in mesh with each other and rotatably mounted to a main frame, one of the gears being a drive gear, a pair of right and left racks being respectively in mesh with the right and left gears so as to reciprocate in axial direction of pipes, and a pair of right and left regulators being respectively secured to the right and left racks so as to come into contact with ends of the pipes to thereby center the pipes when the right and left racks are driven towards each other.

It is also a characteristic feature of the pipe centering apparatus in the invention that the main frame is supported capable of being raised and lowered, and a pair of right and left supporting pins are secured respectively to the right and left regulators so as to protrude inwardly from inner or pipe-contacting surfaces thereof, thereby the supporting pins being made capable of being inserted in the ends of the pipes.

In the pipe centering apparatus as summarized above, when the drive gear is actuated, the gears including the drive gear rotate in opposite directions so that the right and left racks also are moved horizontally in opposite directions whereby the right and left regulators moves towards or away from each other. By virtue of such a structure of the apparatus, the pipes on a pipe-supporting means such as a conveyor can be centered accurately in their longitudinal direction owing to such a symmetrical motion of the regulators, even if the pipes were of considerably different length.

Further, because the apparatus comprises the main frame capable of being raised and lowered and the right and left supporting pins protruding inwardly to be inserted in the pipe ends, the pipe can be centered longitudinally in the following manner. Namely, the drive gear is rotated an appropriate angle so that none of the regulators comes into contact with the pipe ends but both of the supporting pins are inserted in the ends of the pipe lying on the conveyor or other suitable transporting means. Subsequently, the main frame is raised to cause the supporting pins to lift and detach the pipe from the conveyor or the like. Then, the drive gear is further rotated to force both the regulators into contact with both ends of the pipe, respectively, so that it is centered as to its longitudinal position. Finally, the main frame is lowered again to let the pipe rest on the conveyor.

BRIEF DESCRIPTION OF THE DRAWINGS

FIG. 3 is a plan view of a chamfering equipment employing the pipe centering apparatus in the embodiment;

FIG. 4 is a side elevation showing a pipe rest attached to a conveyor which is incorporated in the chamfering equipment; and FIG. 5 is a plan view of a prior art centering apparatus used in a chamfering equipment.

DETAILED DESCRIPTION OF PREFERRED EMBODIMENTS

Figure 1:
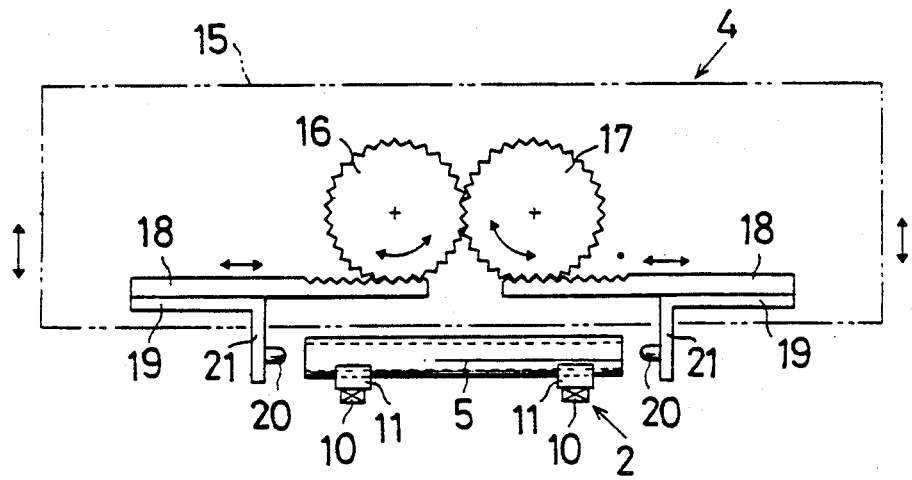
FIG. 1 in the accompanying drawings is a front elevation showing a state of a pipe centering apparatus in an embodiment of the invention, before the apparatus starts its centering operation.

A pipe centering apparatus employed in a both-ended chamfering equipment in an embodiment of the invention will now be described in detail referring to the drawings.

The reference numeral 1 in FIG. 3 denotes the both-ended chamfering machine, with the reference numerals 2 and 3 respectively denoting an upstream and downstream conveyors disposed behind and ahead the chamfering machine 1, respectively, and the reference numeral 4 denotes a pipe centering apparatus located across the upstream conveyor 2.

The both-ended chamfering machine 1 has been widely used and is of the so-called fixed-pipe type. It comprises a pair of right and left clampers 6 clamping an intermediate portion of each pipe 5, and a pair of right and left rotary machining tools 7. Both ends of each pipe 5 held in place by the clampers 6 are chamfered by driving the rotary machining tools 7 to rotate and move towards each other.

The upstream and downstream conveyors 2 and 3 each comprise a pair of right and left circulating endless chains 10 which ar driven intermittently and synchronously with each other. As shown in FIG. 4, plural pairs of pipe rests 11 are attached to the chains 10 at corresponding outer positions thereof at regular intervals. Each pipe 5 lies on the pipe rests 11 to take its horizontal position perpendicular to a direction in which it is transported.

Figure 2:
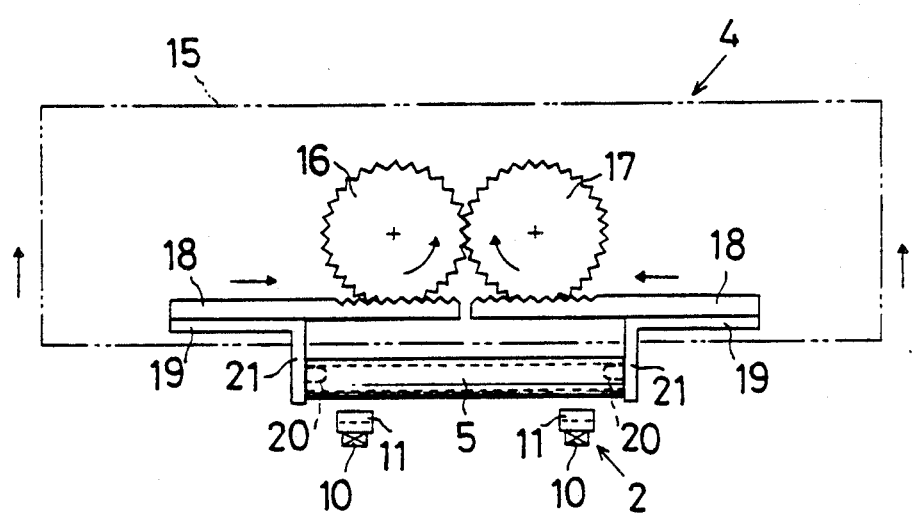
FIG. 2 is another front elevation the apparatus in its operating state.

On the other hand as shown in FIGS. 1 and 2, the pipe centering apparatus 4 comprises a main frame 15, and a pair of right and left gears 16 and 17 rotatably mounted on the main frame 15. The pipe centering apparatus further comprises a pair of right and left racks 18 supported by the main frame 15 so as to move in a horizontal and right-to-left direction, the racks 18 each having a regulator 19 attached thereto, and each regulator 19 having a supporting pin 20 protruding inwardly from the regulator.

The main frame 15 is driven by an actuator (not shown) so as to be raised and lowered.

The right and left gears 16 and 17 are of the same kind, and they are of the same size and have the same number of their teeth. The gears 16 and 17 always engage with each other at their inner opposite portions so that one of them 16 may be connected to an electric motor or any other proper actuator (not shown) so as to be driven thereby to rotate the other 17 in unison with the one or drive gear 16.

The racks 18 are in mesh with the gears 16 and 17, respectively, at lower portions thereof. Thus, the racks 18 make symmetrical motions to come close to and away from each other.

The regulators 19 are of an L-shape having a horizontal section and a vertical section extending therefrom, the former section being directly or indirectly connected to each rack 18, with the vertical section being formed as a contact arm 21 which is to come into contact with a corresponding end of each pipe 5.

Supporting pins 20 protrude coaxially with each other from inner surfaces of the contact arms 21 of the regulators 19.

In operation of the pipe centering apparatus, the upstream conveyor 2 feeding the pipe 5 to the chamfering machine will make a pause every time when one of the pipes successively transported arrives at the apparatus 4. Then, the drive gear 16 in the pipe centering apparatus starts to rotate so that the right and left regulators 19 move towards each other. As a result, the supporting pins 20 of the regulators 19 are inserted into the ends of the pipe 5, but with the regulators 19 themselves being controlled not to contact the pipe ends. Subsequent to this step, the main frame 15 is lifted so that the supporting pins 20 raise the pipe 5 away from the conveyor 2, causing the pipe to be out of contact with it. Any pipe of a length smaller than a predetermined standard will be detected at this step since it cannot engage with the supporting pins 20.

Next, the drive gear 16 is actuated again in the same direction as at the preceding step so that the two regulators 19 get closer to each other until the inner surfaces of both of their contact arms 21 come into contact with the respective ends of the pipe 5. The pipe 5 is centered in this manner as to its longitudinal position. After that, the main frame 15 is lowered to put the pipe 5 on the pipe rests 11 of the conveyor 2. The drive gear 16 is subsequently rotated in reverse direction to displace the regulators 19 away from each other and to thereby withdraw the supporting pins 20 from the pipe ends.

Further, the conveyor 2 starts again to move in the same direction so that the pipe 5 is transported to an extremity of the conveyor 2. The pipe 5 will then be taken out from the conveyor by a suitable device (not shown) and be transferred onto the chamfering machine 1. The clampers 6 of this machine hold in place the pipe 5 while it is chamfered by the pair of right and left rotary machining tools 7. Since the pipe 5 has been already centered precisely before the chamfering process, two ends of the pipe 5 can be machined or chamfered in the same manner and by the same length. Periods of time required to machine the ends are also the same, with the right and left machining tools being abraded to the same degree. Neither one nor the other end of the pipe 5 remains unmachined or unground after the chamfering process. Thereafter, the suitable device will take out the pipe from the chamfering machine 1 and put the pipe on the downstream conveyor 3 for the next process.

In an modification of the embodiment described above, the main frame 15 of the pipe centering apparatus can move in a direction in which the conveyors extend. The pipes 5 are delivered to the clampers 6 of the chamfering machine 1 directly from the upstream conveyor 2, without necessitating the suitable device referred to above.

It is a matter of course that the pipe centering apparatus can be employed in any equipments other than the double-sided chamfering machine exemplified in the embodiment.

It will now be apparent that the pair of right and left gears as well as the pair of right and left racks are driven symmetrically in opposite directions so that the right and left regulators moves towards or away from each other to thereby center the pipes' longitudinal positions. Thus, the pipes can be centered accurately in their longitudinal direction owing to such a symmetrical motion of the regulators, even if the pipes were of considerably different length.

Further, because the apparatus comprises the main frame capable of being raised and lowered and the right and left supporting pins which protrude inwardly from the pipe-contacting surfaces of the regulators and are adapted for insertion into the pipe ends, the pipes can be centered longitudinally during they are out of contact with the conveyor. This structure is effective to protect the pipes from scratches or other damages not only during the centering process but also when they are taken off the conveyor. Thanks to such an effect, the thus centered and chamfered pipes free from any surface damages are advantageously used as the high surface precision drawn pipes such as the photosensitive drum bodies, with an improved yield of acceptable products from the processes.

What is claimed is:

1. A pipe centering apparatus comprising: a pair of right and left gears in mesh with each other and rotatably mounted to a main frame, one of the gears being a drive gear; a pair of right and left racks respectively in mesh with the right and left gears so as to reciprocate in axial direction of pipes; and a pair of right and left regulators respectively secured to the right an left racks so as to come into contact with ends of the pipes to thereby center the pipes when the right and left racks are driven towards each other.

2. A pipe centering apparatus in accordance with claim 1, wherein the gears are of the same kind wherein they are of the same size and have the same number of their teeth.

3. A pipe centering apparatus in accordance with claim 1 or 2, wherein the racks are in mesh with the gears, respectively, at lower portions thereof.

4. A pipe centering apparatus in accordance with claim 1, wherein the main frame is capable of being raised and lowered, and further comprising a pair of right and left supporting pins which inwardly protrude from pipe-contacting surfaces of the regulators so as to be inserted in ends of each pipe.

* * * * *